United States Patent

Krishnamurthy et al.

[11] Patent Number: 5,845,099
[45] Date of Patent: Dec. 1, 1998

[54] LENGTH DETECTING UNIT FOR PARALLEL PROCESSING OF VARIABLE SEQUENTIAL INSTRUCTIONS

[75] Inventors: Naveen Krishnamurthy; Nadeem H. Firasta, both of Sunnyvale, Calif.

[73] Assignee: Intel Corporation, Santa Clara, Calif.

[21] Appl. No.: 670,880

[22] Filed: Jun. 28, 1996

[51] Int. Cl.[6] .................................................. G06F 9/30
[52] U.S. Cl. ............................................ 395/380; 395/386
[58] Field of Search .................................... 395/380, 386

[56] References Cited

U.S. PATENT DOCUMENTS

| | | | |
|---|---|---|---|
| 4,502,111 | 2/1985 | Riffe et al. | 395/380 |
| 5,233,369 | 8/1993 | Suzuki | 395/380 |
| 5,355,460 | 10/1994 | Eickemeyer et al. | 395/375 |
| 5,459,844 | 10/1995 | Eickemeyer et al. | 395/375 |
| 5,471,414 | 11/1995 | Kumar et al. | 364/788 |
| 5,513,330 | 4/1996 | Stiles | 395/380 |
| 5,586,276 | 12/1996 | Grochowski et al. | 395/380 |
| 5,598,544 | 1/1997 | Oshima | 395/380 |
| 5,600,806 | 2/1997 | Brown | 395/380 |
| 5,625,787 | 4/1997 | Mahin et al. | 395/380 |

*Primary Examiner*—Richard L. Ellis
*Attorney, Agent, or Firm*—Blakely, Sokoloff, Taylor & Zafman

[57] ABSTRACT

A microprocessor with a circuit that selects at least one instruction from a stream of N successive instruction bytes. The circuit includes a first pointing unit that indicates a position of a first byte of an instruction of the stream of N successive instruction bytes. The circuit also includes a second pointing unit that stores a vector having a length N which indicates a position of a last byte of the instruction in the stream. The circuit further includes a first alignment unit coupled to the first and the second pointing units, the first alignment unit aligns the vector at a position indicating the first byte of an instruction. The circuit includes a first and a second length detecting units that receive the aligned vector in parallel. The first and second length detecting units simultaneously determine the length of a current instruction and the length of a next instruction, respectively, of the stream of N successive instruction bytes.

18 Claims, 6 Drawing Sheets

AND IMPLEMENTATION

FIG. 5A

NOR IMPLEMENTATION

LENGTH DETECTING UNIT FOR PARALLEL PROCESSING OF VARIABLE SEQUENTIAL INSTRUCTIONS

BACKGROUND OF THE INVENTION

1. Field of the Invention

The present invention relates generally to the field of microprocessors. More specifically, the present invention relates to an instruction alignment unit in a microprocessor.

2. Description of Related Art

Designers of complex instruction set computers (CISC) are faced with the problem of providing mechanisms for determining the beginning of each instruction encountered in an instruction stream. This problem arises because CISC type machines have variable lengths instructions. For example, the instruction set architecture of many Intel microprocessors includes instructions that typically vary in length from one byte to fifteen bytes. These instructions are typically handled by the computer processor in sequential order, one after another. In sequential processing, first instruction must normally be decoded, before a second instruction can be executed. Therefore, the processor must have the ability to distinguish between successive instructions.

Most often, processors include an Instruction Fetch Unit (IFU) that fetches instruction bytes from an instruction stream stored in an instruction memory, or the like, and provides these instruction bytes to an Instruction Length Decoder (ILD) which marks the last bytes and first opcode bytes of instructions. After determining the length of an instruction, the ILD passes on the data information to an instruction alignment unit (IAU). (In the context of the present invention, the term "aligning" means distinguishing the end of a current instruction from the beginning of the next instruction and positioning a first byte of a current instruction as the first byte to be sent to an Instruction Decode Unit (IDU). A current instruction is defined as the next-coming instruction waiting in the IAU to be sent to the IDU. The IAU distinguishes the end of the current instruction from the beginning of the next instruction by using information related to the number of bytes in the current instruction provided by the ILD. The IAU then aligns the current instruction and forwards it to the IDU, such that the most significant byte presented to the IDU is the first byte of the current instruction. In a specific implementation the IAU aligns instructions at a maximum rate of two instructions per clock cycle, and thus, a maximum of two complete instructions may be sent to the IDU every clock.

Existent Instruction Alignment Units (IAU) distinguish the end of a current instruction from the beginning of the next instruction, for two or more instructions by using a plurality of serially connected stages. Such "serial" IAUs are not adequate for microprocessors operating at higher frequencies because such high frequencies correspond to shorter clock cycles which constrain the circuit to operate within shorter times. Due to the serial operation of conventional IAUS, the shorter time constraints prevent such IAUs from aligning a predetermined number of instructions within the time allowed by the above-mentioned high frequency. It is thus desirable to provide a mechanism for aligning instructions that can properly operate at higher frequencies.

SUMMARY OF THE INVENTION

The present invention provides, in a microprocessor of a type that includes instructions of variable length, a circuit to select at least one instruction from a stream of N successive instruction bytes. The circuit includes a first pointing unit to indicate a position of a first byte of an instruction of the stream of N successive instruction bytes. The circuit also includes a second pointing unit to store a vector having a length N. The vector indicates a position of a last byte of at least one instruction of the stream of successive instruction bytes. The circuit further includes a first alignment unit coupled to the first and second pointing units. The first alignment unit aligns the vector at the position indicating the first byte of an instruction. The circuit further includes a first length detector to receive an aligned vector from the first alignment unit and to determine a length of a first instruction of the stream of N successive instruction bytes. The circuit further includes a second length detector to receive in parallel the aligned vector and to determine a sum of the length of the first instruction and the length of a second instruction. The second length detector includes a plurality of units $U_i$, with i equal 1 to M, each unit $U_i$ receives in parallel the aligned vector and responsive thereto generates a speculative sum of a speculative length of the first instruction and of a speculative length of the second instruction. Each unit $U_i$ assumes that the speculative length of the first instruction is equal to i.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION

In the following description, numerous specific details are set forth to provide a thorough understanding of the present invention. However, one of ordinary skill in the art will recognize that the invention may be practiced without these specific details. In some instances, well-known circuits, structures, and techniques have not been shown in detail to avoid obscuring the present invention.

Figure 1:
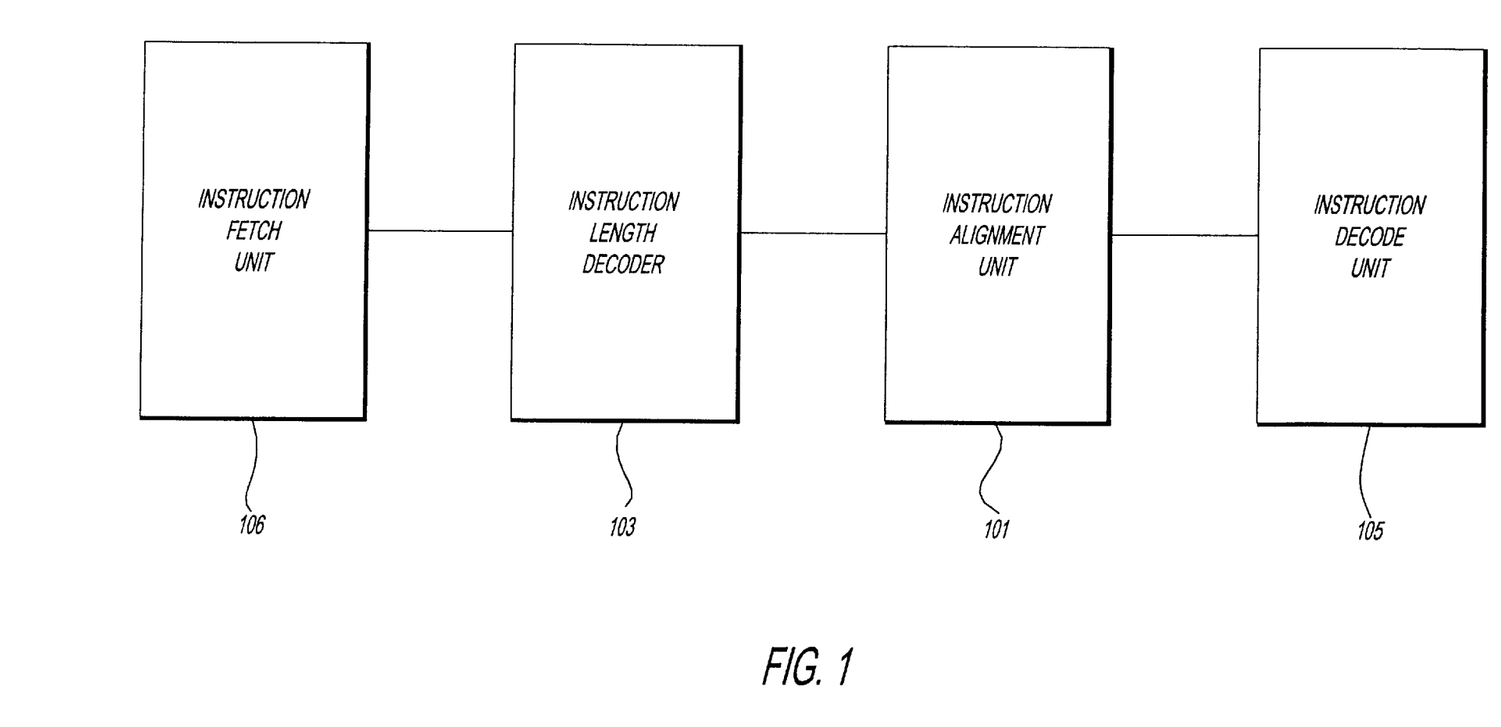
FIG. 1 illustrates a high level block diagram including an instruction alignment unit (IAU) according to the present invention.

FIG. 1 illustrates a high level block diagram including an instruction alignment unit 101 according to the present invention. The instruction alignment unit (IAU) 101 controls the data flow between an instruction length decoder (ILD) 103 and an instruction decode unit (IDU) 105 of a microprocessor. An Instruction Fetch Unit (IFU) 106 forwards instructions to the ILD. In this particular embodiment, by way of non-limiting example, the IAU sends a maximum of two complete instructions to the IDU every clock cycle. Also in this embodiment, the instructions' length can vary from one to fifteen bytes.

Figure 2:
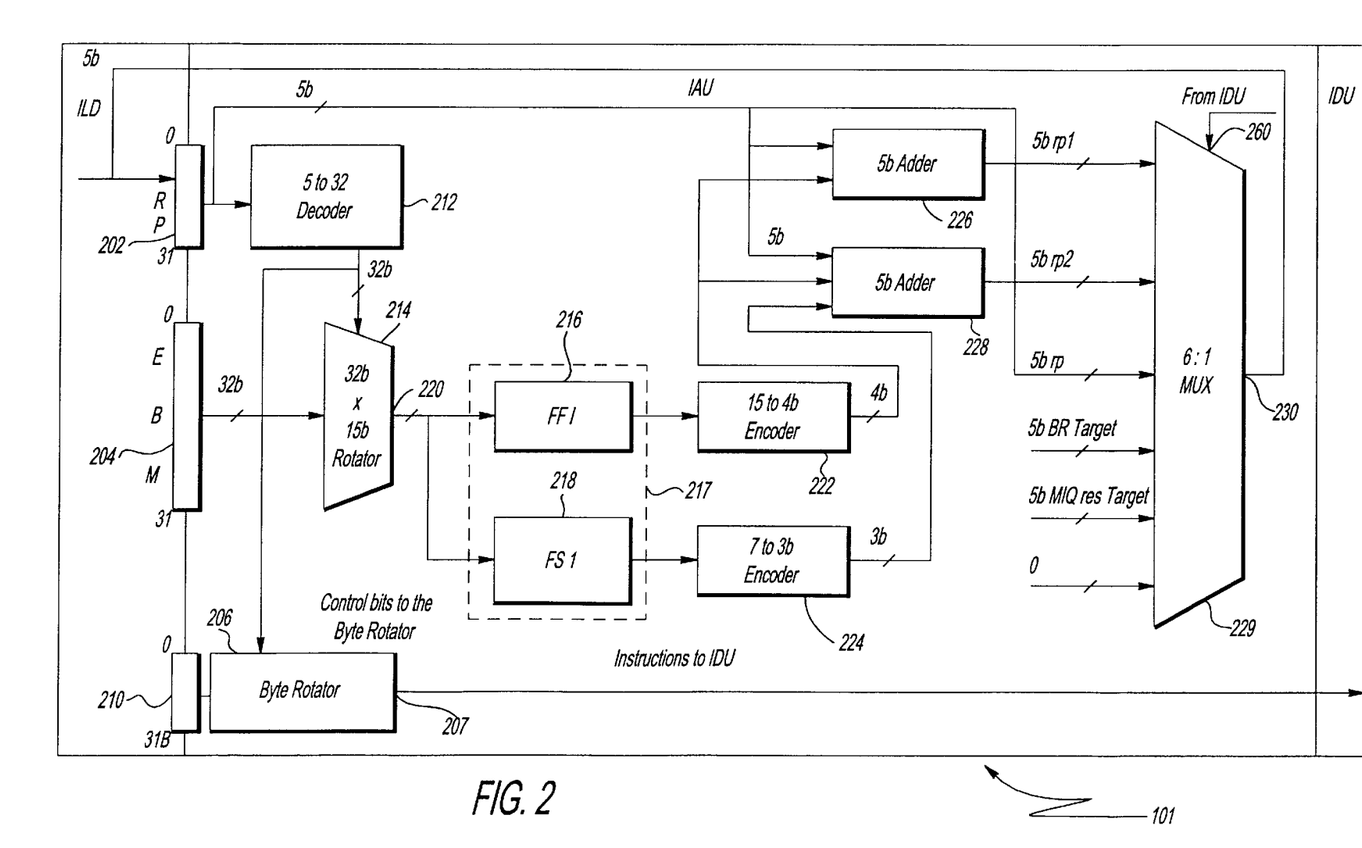
FIG. 2 illustrates a block diagram of an instruction alignment unit (IAU) according to one embodiment of the present invention.

FIG. 2 illustrates in more detail a block diagram of the IAU 101 of a microprocessor, according to the present invention. The instruction alignment unit 101 according to the present invention includes an instruction buffer 210 which typically receives a stream of N successive instruction bytes from the ILD. By way of non-limiting example, in the embodiment illustrated in FIG. 2, the instruction buffer 210 stores 32 successive instruction bytes. These instructions are not differentiated from one another and vary in length. An instruction fetch unit (IFU 106 of FIG. 1) forwards instructions to the ILD from a memory or a cache device where instructions are held in sequential order. The instructions may similarly be selected from a computer bus or from other devices which present such instructions in successive order.

The IAU also includes a first pointing unit 202 (hereinafter "read pointer buffer 202") for storing a read pointer. A read pointer is a binary vector which points to a first byte of an instruction belonging to the stream of 32 successive instructions stored in instruction buffer 210. In this particular embodiment, the read pointer is initialized, by a global reset in the first machine cycle, to point to a first byte of an instruction. As instructions are sent to the IDU from the IAU, the read pointer is updated to point to the first byte of the next instruction waiting to be sent to the IDU. In the embodiment shown in FIG. 2, the read pointer has 5 bits. A read pointer decoder 212 decodes the five bits of the read pointer and generates at an output thereof a 32-bit vector with a '1' appearing at a position corresponding to the position of the first byte of the first instruction in the stream of 32 bytes.

The IAU further includes a second pointing device (hereinafter "end byte marker buffer 204") which stores an end byte marker. The end byte marker is a binary vector having a length equal to the length of the stream of bytes included in the instruction buffer 210, i.e., the end byte marker has 32 bits. The end byte marker indicates a position of a last byte of at least one instruction which is included in the stream of successive instruction bytes stored in the instruction buffer 210. The 32 bits of the end byte marker are lockstepped to the 32 successive instruction bytes stored in the instruction buffer 210 such that the endbit marker will include an active bit at a position corresponding to a position of a last byte of at least one instruction stored in the instruction buffer 210. For example, assuming that the 32 byte stream of instructions stored in the instruction buffer 210 includes a first instruction which ends at the seventh byte of the 32 byte stream and a second instruction which ends at the thirteenth byte of the 32 byte stream. In this case, the end byte marker will be a 32-bit vector having all bits set to "0," but for the seventh and the thirteenth bits which would be active i.e., in this particular example will be set to "1."

The end byte marker buffer 204 is coupled to a first alignment device (hereinafter "end bit rotator 214"). The end bit rotator 214 is coupled to an output of the read pointer decoder 212 which generates the decoded read pointer of 32 bits. As explained above, the decoded read pointer has one of its bits set to a '1' at a position corresponding to the position of the first byte of the first instruction in the stream of 32 bytes. The end bit rotator 214 rotates the 32 bits by a number of bits equal to the value of the decoded read pointer. For example, assuming that the decoded read pointer has the fifth bit of the stream of 32 bits, set to logic 1, the rest of the bits being set to 0, the rotator 214 rotates the end byte marker by five bits such that the first bit of the end byte marker corresponds to the first byte of the first instruction in the stream of 32 instruction bytes stored in the instruction buffer 210. The end bit rotator 214 then shifts out a subset of the 32 bits. In this particular case, the end bit rotator 214 shifts out the first 15 bits of the 32-bit end byte marker.

The 15 bits of the 32 bits are driven to a first length detecting unit 216 (hereinafter a "find first '1'" circuit 216) and to a second length detecting unit 218 (hereinafter "find second '1'" circuit 218). The first and the second length detecting units receive in parallel the 15 first successive bits of the aligned 32-bit end byte marker. The "find first '1'" circuit 216 determines the first occurrence of an active bit in the stream of 15 bits, while the "find second '1'" circuit 218 determines the second occurrence of an active bit in the stream of 15 bits. In the particular implementation of the present invention illustrated in FIG. 2, the active bit is a logic '1'. The first find '1' circuit 216, thus, scans the 15-bit subset of the 32 bit end marker for the first occurrence of '1' which indicates a last byte of a first instruction IOU, as the end byte marker includes bits set to '1' at locations corresponding to the end of an instruction. The find second '1' circuit 218 determines a last byte of a second instruction $I_1$ by finding a second occurrence of a '1' in the stream of 15 bits. Once the position of the last byte of the first and of the second instructions is determined, the length of the first and second instructions are calculated by counting the number of successive bits appearing from the first bit of the 15 bits up to the first occurrence of a '1' and between the first occurrence of a '1' and the second occurrence of a '1' respectively. The first and second length detection units may be implemented by ordinary digital logic and the task of doing so is well within the skill of an ordinary practitioner. The determination of the length of the second instruction is thus performed by the circuit 218 in parallel with the determination of the length of first instruction by the circuit 216. Therefore, the circuit illustrated in FIG. 2 overcomes the deficiencies of the prior art circuits wherein the circuit determining the end or the length of a second instruction has to wait for a previous serially connected circuit to determine the end or the length of the first instruction.

The IAU 101 further includes a first encoder 222 coupled to the "find first '1'" circuit 216. The encoder 222 encodes the length of the first instruction into a binary number having a maximum of 4 bits. Similarly, the find second '1' circuit 218 is coupled to a second encoder 224 which encodes the length of the second instruction into a 3-bit number. A vector representing the encoded length of the first instruction is then fed to a first input of a first adder 226. The first adder 226 has a second input coupled to an output of the read pointer buffer 202 which stores the current read pointer. The first adder 226 generates at an output thereof a 5-bit first read pointer RP1. The read pointer RP1 points to the beginning of a second instruction in the 32-byte stream stored in the instruction buffer 210. A second adder 228 receives at a first input thereof and encoded vector from the second encoder 224. The second adder 228 has a second input, coupled the output of the first encoder 222, and a third input coupled to the read pointer buffer 210. The second adder 228 generates at an output thereof a second read pointer (RP2) which represents the sum of the first read pointer, the first instruction's length, and the second instruction's length. The second read pointer RP2 points to the beginning of a third instruction, if such third instruction exists, in the 32 bytes stream of the buffer 210.

The first read pointer RP1, the second read pointer RP2, and the current read pointer RP are coupled to three separate inputs of a multiplexer 229. The multiplexer 229 has a fourth input for receiving a branch target read pointer, a fifth input for receiving a macro instruction queue read pointer (MIQ), and a sixth input for reset. If it is determined that the first instruction in the next cycle should be a branch instruction then the multiplexer 229 controllably selects the branch target read pointer gated at its fourth input. The multiplexer 229 receives a control signal at a control input 260, from the IDU according to which it selects one of its inputs and gates that input to an output thereof The output of the multiplexer 229 is fed back to an input of the read pointer buffer 202, thereby updating the current read pointer. For example once the first read pointer RP1 is generated at the first input of the multiplexer 229 and this first input of the multiplexer is selectively gated at the output of the multiplexer 227, the read pointer buffer 202 will be updated with RP1 which becomes the current read pointer. This current read pointer will point to the first byte of the first instruction in the stream of 32 bytes of the byte rotator 206. Generally, for determining the beginning of the first instruction in the next cycle either RP1 or RP2 will be selected at the output of the multiplexer 230 depending on whether one single instruction is included in the 32 byte stream of instructions stored in the buffer 210 or two instructions respectively are included in the buffer 210.

The instruction buffer 210 is coupled to a second alignment unit (hereinafter byte rotator 206) which can receive each clock cycle 32 new instruction bytes from the instruction buffer. The rotator 206 aligns the 32 instruction bytes at a position corresponding to the first byte of a current instruction. The read pointer stored in the read pointer buffer 202 is decoded by read pointer decoder 212 which sends the decoded read pointer to the byte rotator 206. The byte rotator 206 then rotates the stream of instructions stored in the byte rotator according to the decoded read pointer such that a first byte of a current instruction corresponds with the first byte to be sent out at an output 207 of the rotator (alignment). The output 207 of the rotator is coupled to the instruction decode unit (IDU) which can receive a maximum of two instructions per clock cycle. The rotator 206 ensures that the first byte of the first instruction sent to the IDU in one clock cycle is "aligned."

Figure 3:
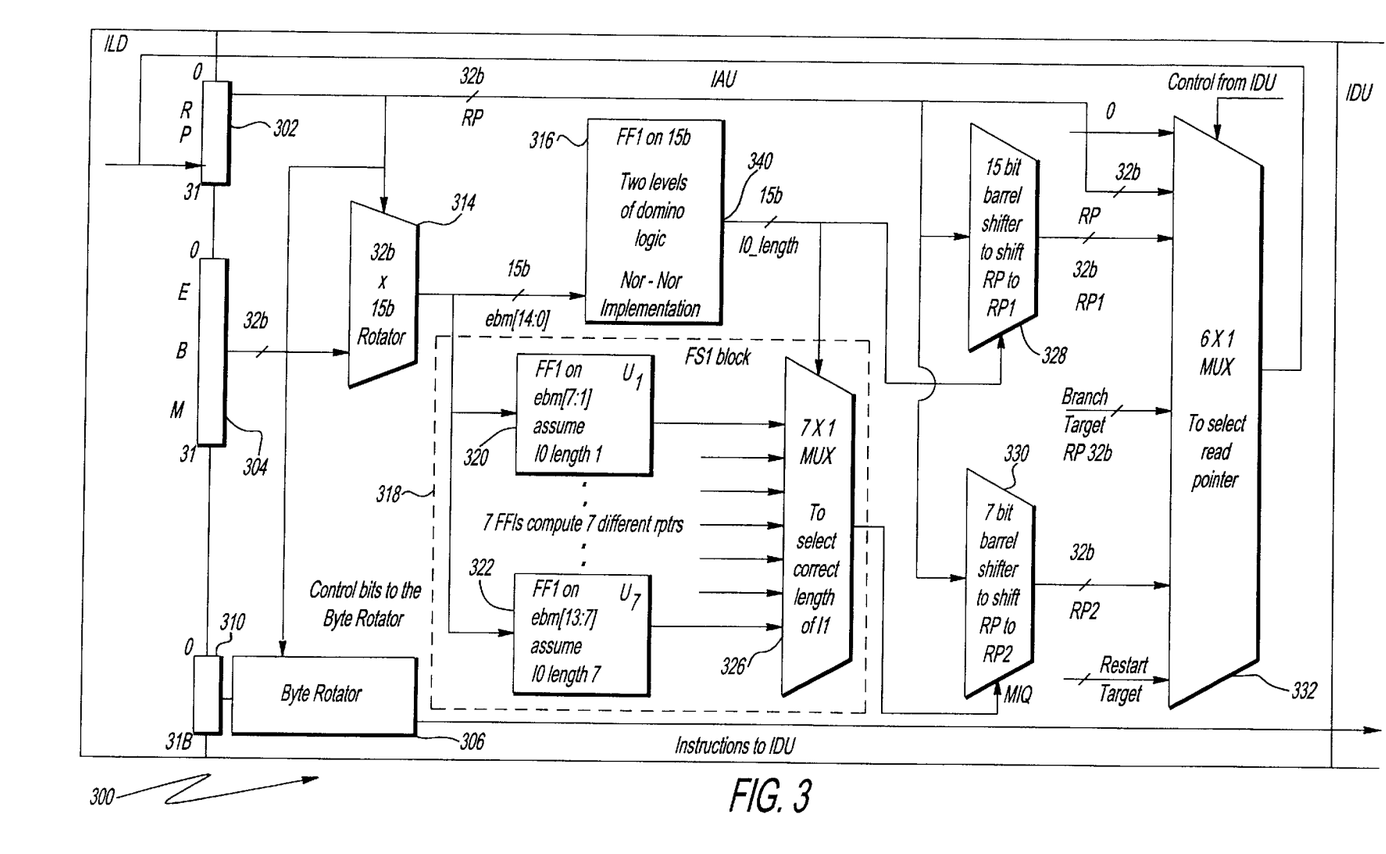
FIG. 3 illustrates a block diagram for an alternative embodiment of an instruction alignment unit (IAU) according to the present invention.

FIG. 3 illustrates an alternative embodiment of an instruction alignment unit (IAU) 300 according to the present invention. Instruction alignment unit 300 includes a first pointing unit 302 (hereinafter read pointer buffer 302) which stores a decoded 32 bit read pointer. The decoded read pointer is a binary vector which indicates the position of a first byte of an instruction stored in an instruction buffer 310. The use of a decoded read pointer confers higher speed to the embodiment illustrated by FIG. 3. The two main advantages of using decoded read pointers are: faster output from device 314 due to presence of predecoded controls to the shown rotator; and barrel shifters 328 and 330 are used instead of adders 226 and 228 of FIG. 2, to calculate read pointer 1 and read pointer 2 (RP1 and RP2 of FIG. 3).

Shifters are primarily faster than adders. Barrel shifters, such as 328 and 330, are unaligned rotators which allow the selection of n bits from an input stream of m bits. The n bits can be selected starting at any location. These rotators allow wrap-around.

The instruction buffer 310 stores 32 bytes of successive instructions received from the ILD. The IAU further includes second pointing device 304 (hereinafter "end byte marker buffer 304") which stores an end byte marker. The end byte marker has the same function as the end byte marker described in conjunction with FIG. 2. Typically the end byte marker according to the present invention includes 32 bits lockstepped to the 32 bytes of the 32 successive instruction bytes stored in the instruction buffer 310. The end byte marker will have a zero stored in each of its 32 bits but for the bits located a positions corresponding to the position of a last byte of an at least one instruction stored in the instruction buffer 310. These particular bits are typically set to '1'. The end byte marker buffer 304 is coupled to a first alignment unit (hereinafter "end bit rotator 314").

The end bit rotator 314 has a control input which receives the 32 bits of the decoded current read pointer stored in the read pointer buffer 302. The end bit rotator 314 rotates the 32-bits included therein by a number of bits equal to the decoded read pointer as explained above in conjunction with FIG. 2. The read pointer included in the read pointer buffer 302 is also received by a second alignment unit (hereinafter "byte rotator 306"). The byte rotator 306 aligns the 32 instruction bytes as explained in conjunction with the embodiment illustrated in FIG. 2.

The end bit rotator 314 aligns the 32 bits stored therein such that the first bit corresponds to the first byte of the first instruction in the stream of 32 instruction bytes stored in the instruction buffer 310. The end bit rotator 314 then shifts out a subset of 15 bits of the 32 bit end byte marker. A first length detector 316 receives from the end bit rotator 314 an aligned subset of the end byte marker, i.e., the first 15 bits of the aligned end byte marker. The first length detector then determines a length of a first instruction $I_0$ included in the 15 bits. In this particular example, the first length detector is a circuit which determines the first occurrence of an active bit (a '1' in this particular embodiment) in the stream of 15 bits. The length of the first instruction $I_0$ is thus determined by computing the number of bits starting with the first byte of the 15 bits and ending with the first occurrence of a '1'. In this particular embodiment, the circuit 316 is a two-level domino logic circuit.

The end bit rotator 314 simultaneously sends the 15-bit vector to a second length detector 318 (shown in dotted lines). The second length detector 318 receives the 15-bit vector and determines the sum of first and second instruction length based on a speculative length of first instruction. This determination is performed by the second length detector while the first length detector determines the length of the first instruction. The second length detector 318 includes a plurality of units (Ui) for i equals 1 to 7. Each unit Ui receives, in parallel, the aligned 15-bit vector and generates a sum of a length of the first instruction and of a length of a second instruction based on the assumption that the length of the first instruction is i. In this particular embodiment, the seven units, ui, perform an operation similar to the operation performed by the first length detector, except that each unit Ui determines a speculative sum assuming that the length of the first instruction is equal to i.

The instruction alignment unit 300 according to the present invention further includes a first barrel shifter 328 having an input coupled to the first buffer 302 storing the current read pointer. The first barrel shifter 328 has a control input coupled to an output 340 of the first length detector 316. The barrel shifter 328 shifts the read pointer received at its input by a number of bits equal to the length of the first instruction generated by the first length detector 316 at its output. Accordingly, the first barrel shifter 328 will generate at an output thereof a first read pointer which corresponds to the first byte of the next instruction i.e., the first byte of the second instruction.

The instruction alignment unit 300 additionally includes a second barrel shifter 330. The second barrel shifter 330 has an input, coupled to the read pointer buffer 302 for receiving the current read pointer, and a control input coupled to a validating unit 326. By way of non-limiting example, validating unit 326 can be a multiplexer. In response to the output signal received from multiplexer 326, which represents the sum of the first and second instructions, the second barrel shifter 330 will shift the current read pointer by a number of bits equal to the output signal of the multiplexer 326. The second barrel shifter 330 will thus output a second read pointer corresponding to the beginning of a third instruction in the instruction byte stream. The current read pointer, the first read pointer, and the second read pointer are then input to a multiplexer 332 which controllably selects at an output thereof the updated current read pointer.

The use of a decoded read pointer in conjunction with the structural elements of FIG. 3 is advantageous since the encoders and adders of FIG. 2 introduce additional propagation time, require more space on the die and impose additional cost.

Figure 4:
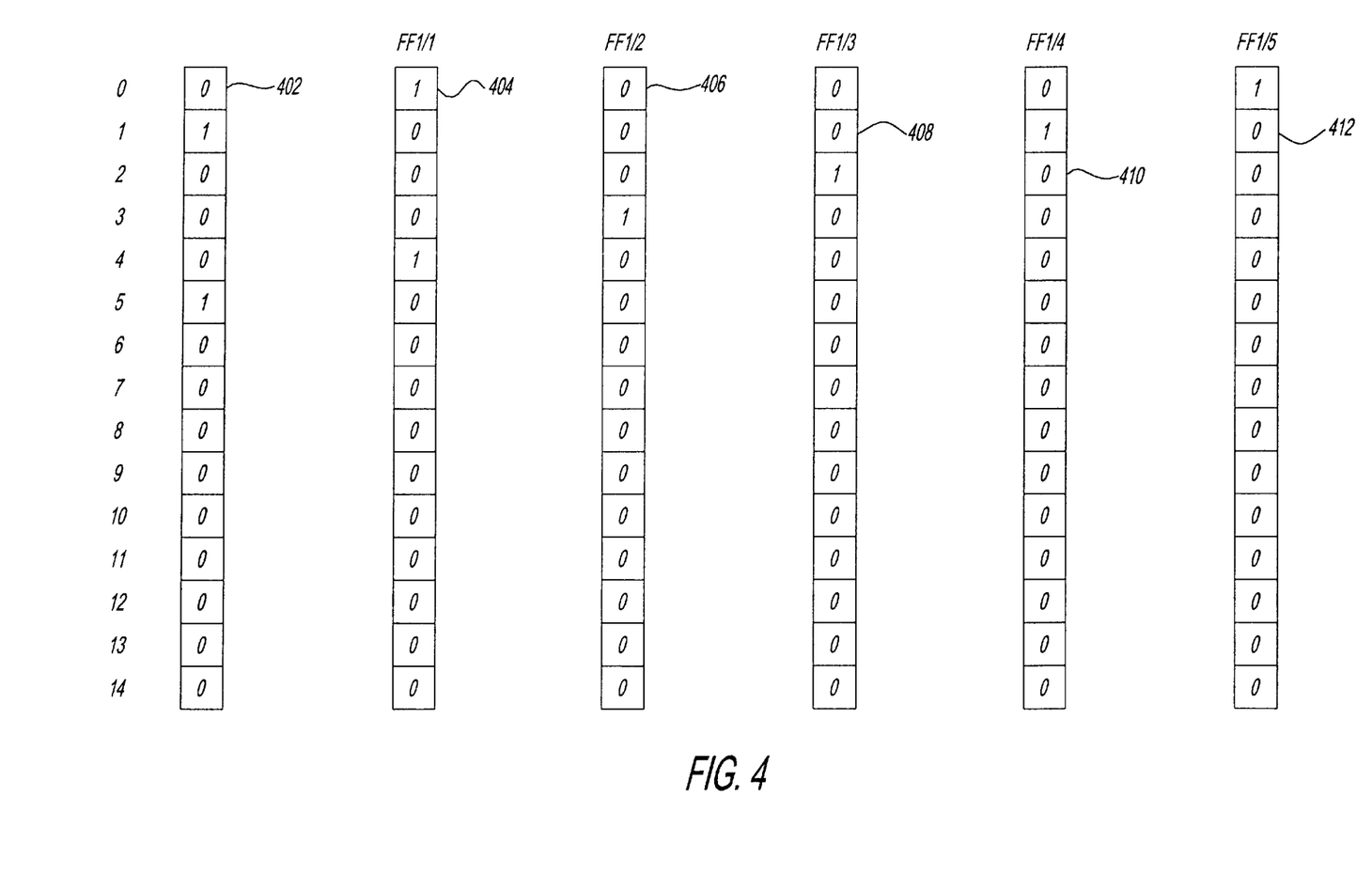
FIG. 4 diagrammatically illustrates the operation of the second length detectors according to the present invention.

FIG. 4 illustrates in more detail the operation of the second length detector of FIG. 3. Let us assume that the vector 402 shown at the left of FIG. 4 is the 15-bit subset of the aligned end byte marker received in parallel by the first length detector 316 and by the second length detector 318 of FIG. 3. The first length detector 316 scans vector 402 for the first occurrence of a '1'. In this case, the first length detector detects a '1' placed in the second bit of the vector 402. Accordingly, the first length detector 316 generates at an output thereof a 15-bit binary signal representing the value '2'.

Next, the units Ui, for i equals 1 to 7, of the second length detector 318 receive the same vector 402 in parallel. The first unit Ui 320 of the second length detector 318 processes vector 402 speculatively assuming that the length of the first instruction $I_0$ is '1'. As such, the first unit $U_1$ 320 appends the first zero of the vector 402 (under the assumption that the length of the first instruction was a '1') and then scans the appended vector 404 for the first occurrence of a '1'. In this particular example, a '1' appears at the location of the first bit of the vector 404, so the first unit 320 will speculatively determine that the second instruction's length is '1'. The first unit 320 then computes a sum of the length of the first instruction and of the length of the second instruction. In this particular example, since the first instruction was assumed to be '1' and the first unit $U_1$ has determined that the length of the second instruction is '1', the sum of the length of the first and second instruction is '2'. Therefore, the first unit 320 outputs a binary vector having the value '2'.

A second unit U2, identical to that shown in FIG. 4, of the second length detector 318 receives the same vector 402 in parallel. The second unit U2 however speculatively assumes that the length of the first instruction was '2'. Accordingly, the second unit U2 appends the first two bits of the binary vector 402 transforming vector 402 into vector 406. The second unit U2 then scans vector 406 for the first occurrence of a '1'. In this case, since a '1' appears in the fourth bit of the vector 406 the second unit U2 speculatively determines that the length of the second instruction is '4'. Since unit U2 speculatively assumed that the length of the first instruction was '2', this unit generates at an output thereof a sum of '6'.

A third unit U3, which receives in parallel the same vector 402, assumes that the length of the first instruction was '3'. Accordingly, the third unit U3 appends the three first bits of the vector 402 generating the vector 408. The third unit U3 scans for the first occurrence of '1' in vector 408. In this particular example, U3 determines, based on the first occurrence of a '1' in vector 408, that the speculative length of the second instruction is '3'. Accordingly, the third unit U3 generates at an output thereof a speculative sum of the first and second instructions length which is '6'. In a similar way, a fourth unit U4 (not shown) assumes that the length of the first instruction is '4' and, thus, appends the first four bits of the vector 402, thereby generating a vector 410. Vector 410 is scanned for the first occurrence of a '1'. In this case, a '1' is found at the second bit of vector 410. Accordingly, the fourth unit U4 determines that the speculative sum of the first and second instruction length is '6'. The same process continues for a fifth, a sixth and a seventh units of the second length detector 318.

Referring back to FIG. 3, the validating unit 326 has a plurality of inputs (in this particular example seven inputs) corresponding to each of the units Ui of the second length detector 318. The validating unit 326 receives at the inputs thereof the speculative sums generated by each of the units Ui for i equals 1 through 7. The validating unit 326 includes a control input coupled to the output 340 of the first length detector 316. In this particular embodiment, validating unit 326 is a multiplexer that receives a control signal, indicating the length of the first instruction, from the first length detector 316. In response to this control signal, the multiplexer 326 selects an input that corresponds to the length of the second instruction. Since the length of the first instruction and thereby the control signal indicates the value '2', the multiplexer 326 selects the second input thereof at its output. The second input to the multiplexer 326 is generated by the second unit which is the only unit which correctly assumed the right length for the first instruction as being '2'. Accordingly, multiplexer 326 will output at an output thereof a validated (correct) sum of the length of the first instruction and of the length of the second instruction.

Figure 5A:
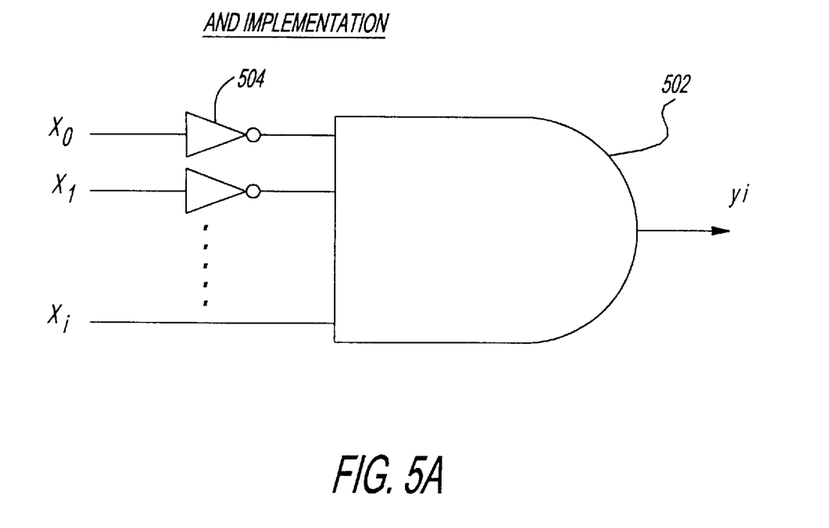
FIG. 5a illustrates a logic implementation that generates a specific bit of a vector generated by a "find first 1" circuit according to the present invention.

FIG. 5a illustrates a specific implementation for generation of a bit of a vector Y generated by a "find first 1" circuit, such as the first length detector explained in conjunction with FIG. 3. One logic implementation of the function is shown as AND gate 402, which receives i inputs for $0 \leq 1 \leq N-1$. The output yi is thus a function of the input signals $x_0$-$x_i$ generated by the endbit rotator 314 of FIG. 3. Accordingly, the first length detector 316 on FIG. 3 can be implemented by a function:

$$yi = \overline{x0} * \overline{x1} * \ldots * \overline{xi-1} * xi$$

Figure 5B:
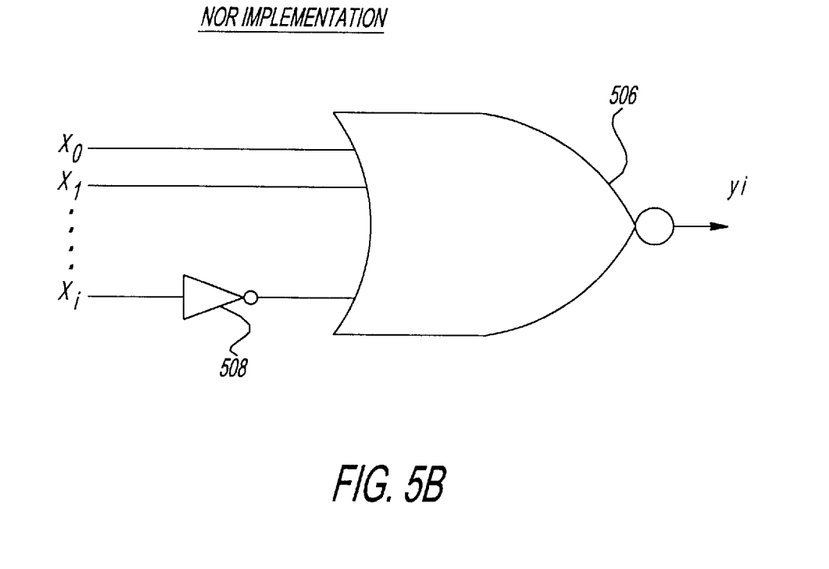
FIG. 5b illustrates an alternative logic implementation that generates a specific bit of a vector generated by a "find first 1" circuit according to the present invention.

FIG. 5b shows an alternative implementation for generating the signal yi of the vector Y, for $0 \leq i \leq N-1$. According to this implementation, a NOR gate 506 is used in conjunction with the signals $x_0$-$x_i$ to yield the signals yi. The signals yi can be derived from the formula:

$$yi = \overline{x0+x1+ \ldots xi-1+xi}$$

The NOR implementation is a faster implementation than the AND implementation shown in FIG. 5a.

Figure 6:
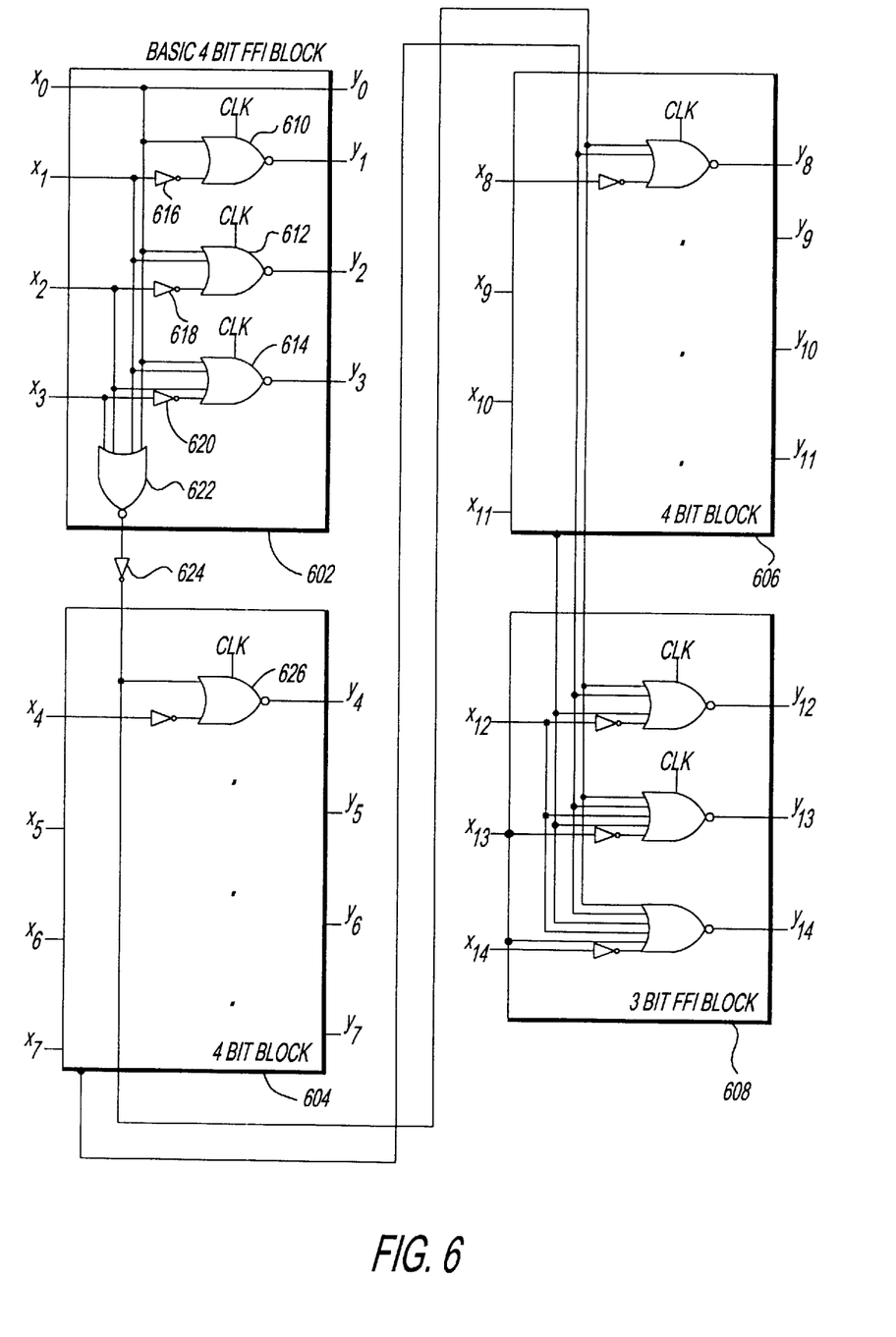
FIG. 6 illustrates in detail a logic circuit implementing the "find first 1" circuit.

FIG. 6 shows in detail a logic implementation of the find first '1' circuit 316 of FIG. 3. By way of non-limiting example, in this particular implementation 15 bits $x_0$-$x_{14}$ are fed to the first find '1' circuit 600 by the bit rotator 314 of FIG. 3. The circuit 600 can be divided into four blocks: 602, 604, 606, and 608. These four blocks include logic for generating the 15 bit output signal $y_0$-$y_{14}$. Each of the four blocks shown in FIG. 6 use the NOR implementation shown in FIG. 5b for generating the output bits yi of the 15 bit output vector.

Referring now to block 602, this block includes four NOR gates 610, 612, 614 and 622. Gates 610, 612 and 614 in conjunction with inverters 616, 618 and 620 respectively, generate signals y1, y2 and y3 respectively. According to the formula:

$$yi = x0 + x1 + \ldots xi-1 + \overline{xi}$$

NOR gate 622 is coupled at its input to the input signals x0, x1, x2 and x3 and generates a signal which is then fed to an inverter 624 for further driving these signals to NOR gates included in the second block 604.

With respect to the block 604, this block includes logic substantially similar to the logic included in block 602. Block 604 includes four NOR gates (of which only one NOR gate, 626, is shown) coupled to the input signals x0, x1, x2 and x3 and to the signal x4. Similarly, block 606 contains logic substantially identical with the logic of block 604. Block 608 also contains logic substantially identical with the logic of block 604, with the exception that block 608 is a 3-bit block generating only three of the 15 bits of the output signal.

Back to the "find second '1'" circuit of FIG. 3. This circuit is substantially identical in implementation with the implementation shown in FIG. 6 with the exception that each of the seven blocks of the "find second '1'" circuit shown in FIG. 3 perform a "find first '1'" operation on the first seven bits of the appended 15 bit input vector $x_0$-$x_i$ for $0 \leq i \leq 14$.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. In a microprocessor of a type that includes instructions of variable length, a circuit to select at least one instruction from a stream of N successive instruction bytes, said circuit comprising:
   a first pointing unit to indicate a position of a first byte of an instruction of said stream of N successive instruction bytes;
   a second pointing unit to store a vector having a length N, said vector indicating a position of a last byte of at least one instruction of said stream of successive instruction bytes;
   a first alignment unit coupled to said first and second pointing units, the first alignment unit aligns said vector at said position indicating said first byte of an instruction; and
   a first length detector to receive an aligned vector from said first alignment unit and to determine a length of a first instruction of said stream of N successive instruction bytes; and
   a second length detector to receive in parallel said aligned vector and to determine a sum of said length of said first instruction and of a length of a second instruction, said second length detector includes a plurality of units Ui, with i equal 1 to M, each unit Ui receives in parallel said aligned vector and responsive thereto generates a speculative sum of a speculative length of said first instruction and of a speculative length of said second instruction, each unit Ui assumes that said speculative length of said first instruction is equal to i.

2. The circuit of claim 1 further including a validating unit with an input, an output, and a control gate, the unit also receives at said input thereof said speculative sums from each unit Ui, the validating unit receives at said control gate thereof said length of said first instruction and responsive thereto selectively gates at said output thereof, one of said speculative sums.

3. The circuit of claim 2 further including an instruction buffer to store said stream of N successive instructions bytes.

4. The circuit of claim 3 further including a second alignment unit coupled to said first pointing unit and to said instruction buffer to receive said stream of N successive instructions bytes and to align said stream of N successive instruction bytes at said position indicating said first byte.

5. The circuit of claim 4 wherein said first pointing unit includes a first buffer to store a decoded read pointer, which is used in the circuit, indicating said position of said first byte of an instruction of said stream.

6. The circuit of claim 5 wherein said second pointing unit includes a second buffer to store said vector and said vector includes N bits locksteppped to said N successive instruction bytes, said N bits having an active bit at a position corresponding to said position of said last byte of said at least one instruction.

7. The circuit of claim 6 wherein said first alignment unit is a rotator to rotate said N bits by a number of bits equal to said read pointer and to output a subset vector of said N bits.

8. The circuit of claim 7 wherein said first length detector includes circuitry to detect a first occurrence of an active bit in said subset of said N bits.

9. The circuit of claim 8 wherein each of said units Ui includes circuitry to append the first i bits of said subset vector of N bits and to detect a first occurrence of an active bit in said appended subset vector.

10. The circuit of claim 9 further including a first barrel shifter having an input to receive said decoded read pointer, an output, and a control input to replace said length of said first instruction and responsive thereto the barrel shifter shifts said current read pointer by a number of bits equal with said length of said first instruction.

11. The circuit of claim 10 further including a second barrel shifter having an input to receive said decoded read pointer, an output, and a control input to replace the speculative sum detected by said validating unit of said output thereof and in response to said speculative sum received at said control input thereof, said second barrel shifter shifts said current read pointer by a number of bits equal to said speculative sum gated at said output of said validation unit.

12. The circuit of claim 11 wherein said validation unit is a first multiplexer.

13. The circuit of claim 12 further including a second multiplexer having a first input, coupled to said output of said first buffer, a second input coupled to said output of said first barrel shifter, and a third output coupled to said output of said second barrel shifter.

14. In a microprocessor of a type that includes instructions of variable length, a circuit for selecting at least one instruction from a stream of N successive instruction bytes, said circuit comprising:
   a first pointing unit that indicates a position of a first byte of said at least one instruction of said stream;
   a second pointing unit that stores a vector having a length N, said vector indicates a position of a last byte of said at least one instruction of said stream;
   a first alignment unit, coupled to said first and second pointing units, that aligns said vector at said position to indicate said first byte of said at least one instruction;

first and a second length detecting units that receive in parallel an aligned vector from said first alignment device and that simultaneously determines the lengths of a current and of a length of a next instruction, respectively;

an instruction buffer that stores said stream of N successive instructions bytes;

a second alignment unit, coupled to said first pointing unit and to said instruction buffer, that receives said stream of N successive instruction bytes and that aligns said stream of N successive instruction bytes according to said position of said first byte;

said first pointing device includes a first buffer for storing a read pointer indicating said position of said first byte of an instruction of said stream, said first buffer having an input and an output;

said second pointing device includes a second buffer for storing said vector and said vector includes N bits lockstepped to said N successive instruction bytes, said N bits having an active bit at a position corresponding to said position of said last byte of said at least one instruction;

said first alignment unit is a rotator that rotates said N bits by a number of bits equal to said read pointer and that outputs a subset of said N bits;

said first length detecting unit includes circuitry that detects a second occurrence of an active bit in said subset of N bits; and said second length detecting unit includes circuitry that deletes a second occurrence of an active bit in said subset of N bits.

15. The circuit of claim 14 further including a first encoder, coupled to said first length detecting unit of said length detector, the first encoder encoding a first instruction length generated by said first length detecting unit, said circuit further including a second encoder coupled to said second length detecting unit of said length decoder, the second encoder encoding a second instruction length, said first and second encoders each having an input and an output.

16. The circuit of claim 15 further include a first adder further having a first input, coupled to said input of said first buffer, and a second input coupled to said first encoder, said first adder generating at an output thereof a first read pointer pointing to a next instruction in said stream.

17. The circuit of claim 16 further including a second adder having a first input coupled to said input of said first buffer, a second input coupled to said output of said first encoder, and a third input coupled to said output of said second encoder.

18. The circuit of claim 17 further including a multiplexer having a first input coupled to said output of said first buffer, a second input coupled to said output of said first adder, and a third input coupled to said output of said second adder, said multiplexer having an output coupled to said input of said first buffer.

* * * * *